United States Patent
Hicks, III

(10) Patent No.: US 7,626,493 B2
(45) Date of Patent: Dec. 1, 2009

(54) METHODS, SYSTEMS, AND PRODUCTS FOR INTERFACING WITH POWERLINE NETWORKS

(75) Inventor: John A. Hicks, III, Roswell, GA (US)

(73) Assignee: AT&T Intellectual Property I, L. P., Reno, NV (US)

( * ) Notice: Subject to any disclaimer, the term of this patent is extended or adjusted under 35 U.S.C. 154(b) by 53 days.

(21) Appl. No.: 11/895,548

(22) Filed: Aug. 24, 2007

(65) Prior Publication Data

US 2007/0290834 A1    Dec. 20, 2007

Related U.S. Application Data

(63) Continuation of application No. 11/013,227, filed on Dec. 15, 2004, now Pat. No. 7,262,695.

(51) Int. Cl.
G08B 1/08 (2006.01)
H04Q 1/30 (2006.01)

(52) U.S. Cl. ...................................... 340/438; 700/300
(58) Field of Classification Search .................. 340/438
See application file for complete search history.

(56) References Cited

U.S. PATENT DOCUMENTS 5,699,276 A * 12/1997 Roos ..................... 340/870.01
5,777,769 A * 7/1998 Coutinho ............... 340/310.13
6,751,563 B2 * 6/2004 Spanier et al. ................ 702/61

* cited by examiner

*Primary Examiner*—Davetta W Goins
*Assistant Examiner*—Samuel J Walk
(74) *Attorney, Agent, or Firm*—Scott P. Zimmerman PLLC

(57) ABSTRACT

Methods, systems, and products are disclosed for interfacing with a power line network. Electrical power is received from a source, and a voltage of the electrical power is monitored. When the voltage is inadequate, then an alternate power source is automatically connected. A frequency of electrical power provided by the alternate power source is monitored, and high frequency data signals are separated from low frequency power signals.

20 Claims, 3 Drawing Sheets

METHODS, SYSTEMS, AND PRODUCTS FOR INTERFACING WITH POWERLINE NETWORKS

CROSS-REFERENCE TO RELATED APPLICATIONS

This application is a continuation of U.S. patent application Ser. No. 11/013,227, filed Dec. 15, 2004 and entitled "Network Interface Device", now issued as U.S. Pat. No. 7,262,695, and incorporated herein by reference in its entirety.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

This application generally relates to communications and, more particularly, to communications systems sending signals over a power line.

Computer networking is changing. In the past, computer networking required numerous hardwire physical connections between computers, servers, routers, printers, telephones, and other devices. Years of frustration with these hardwire connections spawned the maxim "it's always the physical connection"—meaning many problems were caused by loose or poor cabling. Today, however, a new networking technology is being developed that requires few, if any, cables and wires. This new networking technology sends data and other signals over existing electrical wiring. That is, the user simply plugs the computer device into an electrical outlet, and the computer device receives both electrical power and data via the outlet. This new networking technology is generally termed "power line carrier-based networking," and it promises to simplify computer networking.

What is needed, however, is a network interface device that utilizes power line carrier-based networking." A network interface device, as those of ordinary skill in the art understand, provides a demarcation between a communications network and a customer's internal wiring. This network interface device would provide an interface between the external communications network and the customer's home or business power line carrier-based network. As data is sent and received between the customer's power line carrier-based network and the external communications network, protocols and standards conversions may be required. A network interface device that could perform these conversions would provide broadband data services to the mass market.

SUMMARY

The aforementioned problems, and other problems, are reduced, according to exemplary embodiments, by a power line carrier-based network interface device. This network interface device acts as a gateway to a communications network and to a power line network. The network interface device may be installed at an inside or outside location of a customer's premises and provides an interface between a communications network and the customer's power line network. The network interface device receives electrical power from the customer's circuit breaker distribution panel and also sends/receives signals/packets from the customer's power line network. Because the network interface device interfaces with the customer's power line network, the network interface device establishes a communications service provider as an integral partner of the customer's networking infrastructure. If the communications service provider also owns and installs the network interface device, the communications service provider may remotely manage and administer the operation of the network interface device. This network interface device, then, removes the installation burden from the customer and strengthens the bond between the service provider and the customer. This network interface device also includes features for ensuring that electrical power is always available and, thus, the customer's communications service is infrequently disrupted.

The exemplary embodiments describe a gateway apparatus. The apparatus has an enclosure surrounding a network interface device. The network interface device comprises a communications network interface to a communications network and a powerline network interface to a power line network. A communications module stores in a memory device, a processor communicates with the memory device, and the communications module provides gateway services for the communications network and for the power line network. This power line network is carrier-based and distributes data signals over existing electrical wiring. This power line carrier-based network sends information over a 120 volt, 60 Hz (or 220 volt, 50 Hz in Europe) electrical power distribution system within a building or facility.

According to another embodiment, a method is disclosed for providing gateway services to a customer's premises. This method surrounds a network interface device by an enclosure. The network interface device interfaces with a communications network and a power line network. The network interface device provides gateway services to the communications network and to the power line network using a communications module stored in a memory device and a processor communicating with the memory device. The network interface device may modulate and demodulate signals and perform routing services for forwarding data packets to a destination. The network interface device may also divide low frequency signals and high frequency signals, provide network address translations, and provide Dynamic Host Configuration Protocol functions. The network interface device connects to an electrical power source for the processor and for the memory device. The network interface device also monitors voltage available from the electrical power source and, when the electrical power source is inadequate, automatically connects an alternate power source to the network interface device.

BRIEF DESCRIPTION OF THE DRAWINGS

These and other features, aspects, and advantages of the exemplary embodiments are better understood when the following Detailed Description is read with reference to the accompanying drawings, wherein.

DETAILED DESCRIPTION

Figure 1:
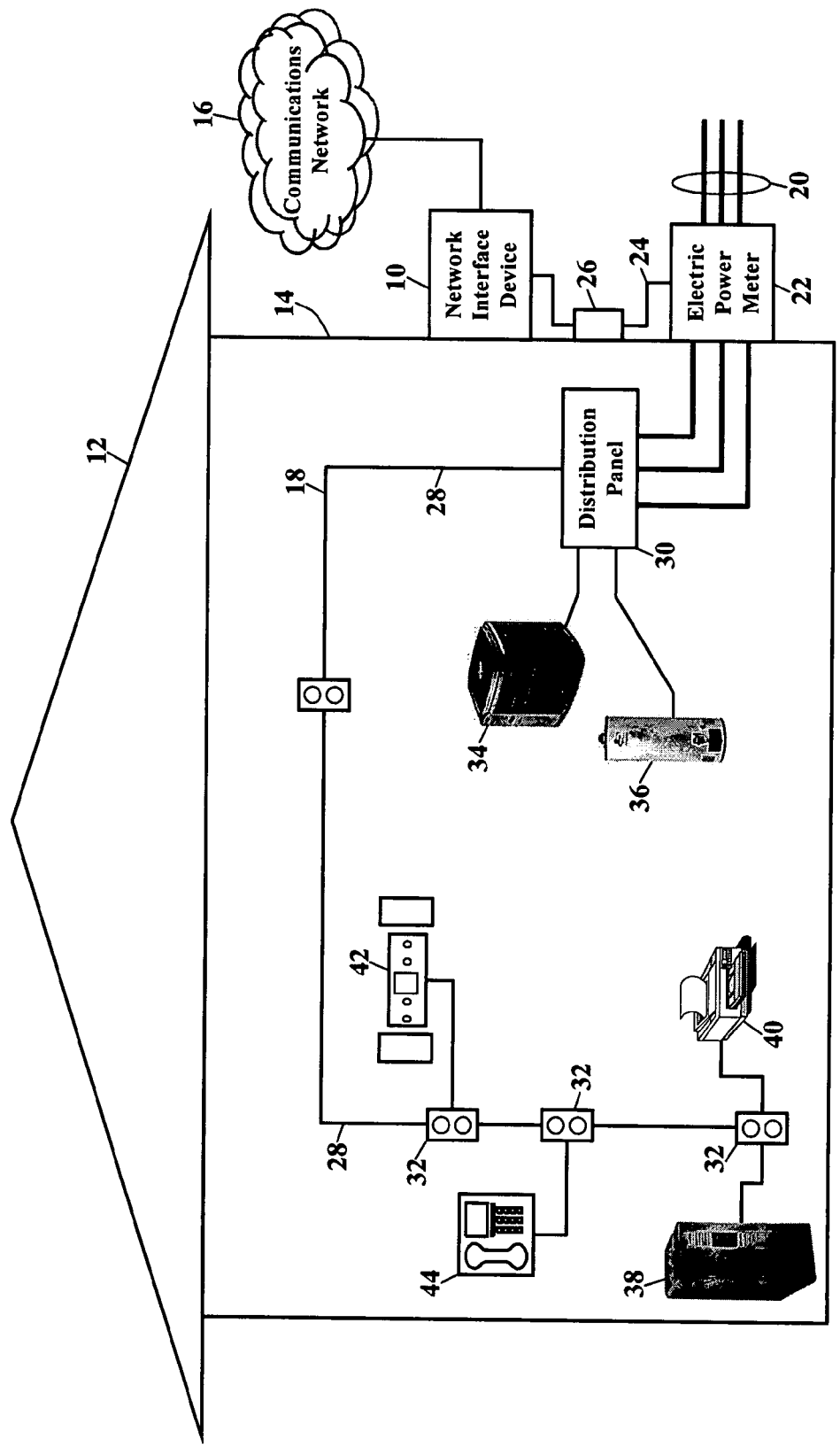
FIG. 1 is a schematic illustrating an operating environment, according to the exemplary embodiments.

The exemplary embodiments now will be described more fully hereinafter with reference to the accompanying drawings. The reader should recognize, however, that the invention may be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting exemplary embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying the exemplary embodiments. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing the exemplary embodiments. Those of ordinary skill in the art further understand that the exemplary hardware, software, processes, methods, and/or operating systems described herein are for illustrative purposes and, thus, are not intended to be limited to any particular named manufacturer.

The exemplary embodiments describe a power line carrier-based network interface device. This network interface device acts as a gateway to a communications network and to a power line network. The network interface device may be installed at an inside or outside location of a customer's premises and provides an interface between a communications network and the customer's power line network. The network interface device may receive electrical power from the customer's circuit breaker distribution panel and also sends/receives signals/packets from the customer's power line network. Because the network interface device interfaces with the customer's power line network, the network interface device establishes a communications service provider as an integral partner of the customer's networking infrastructure. If the communications service provider also owns and installs the network interface device, the communications service provider may remotely manage and administer the operation of the network interface device. This network interface device, then, removes the installation burden from the customer and strengthens the bond between the service provider and the customer. This network interface device also includes features for ensuring that electrical power is always available and, thus, the customer's communications service is infrequently disrupted.

FIG. 1 is a schematic illustrating an operating environment according to the exemplary embodiments. FIG. 1 shows a network interface device 10 operating in a customer's premises 12. The network interface device 10 is shown installed on an outside wall 14 of the customer's premises 12, although the network interface device 10 may be installed at any location inside or outside of the premises 12. The network interface device 10 interfaces with a communications network 16 and with a power line carrier-based network 18. The network interface device 10 provides gateway services that permit signals and/or packets of data to be communicated via the communications network 16 and/or the power line network 18.

The communications network 16 may include copper wires, coaxial cables, fiber optic lines, and/or hybrid-coaxial lines. The communications network 16 may operate in the radio-frequency domain and/or the Internet Protocol (IP) domain. The communications network 16 may include a distributed computing network, such as the Internet (sometimes alternatively known as the "World Wide Web"), an intranet, a local-area network (LAN), and/or a wide-area network (WAN). The communications network 16 may even include wireless portions utilizing any portion of the electromagnetic spectrum and any signaling standard (such as the various cellular standards CDMA, TDMA, GSM, the industrial, scientific, and medical band, and/or the I.E.E.E. 802 family of standards).

The power line network 18 is carrier-based. That is, the power line network 18 distributes signals via electrical wiring installed within the customer's premises 12. This power line carrier-based network 18 typically sends information over a 120 volt, 60 Hz (or 220 volt, 50 Hz in Europe) electrical power distribution system within the customer's premises 12. The power line network 18, however, may distribute signals at any voltage and/or at any frequency. As FIG. 1 shows, electric service is distributed to the customer's premises 12 via electric service wires 20. These electric service wires 20 deliver electrical power from an electrical utility service provider (not shown for simplicity). The electric service wires 20 connect to an electric power meter 22. The electric power meter 22 monitors electrical usage of the customer's premises 12. The network interface device 10 includes a connection 24 to electric to provide electrical power. The network interface device 10 may be connected to the electric power meter 22, or an electrical outlet 26 may be proximally located near the installation location of the network interface device 10. The network interface device 10, as will be further explained, preferably connects to an "always on" electric power source, such that the network interface device 10 can receive signals, and be monitored, regardless of the customer's electric service account status.

The power line network 18 distributes signals via electrical wiring. These signals communicate via copper/aluminum wires 28 from a circuit breaker distribution panel 30 to electrical outlets 32, an HVAC unit 34, and appliances (such as a water heater 36). Various devices plugged into the electrical outlets 32 receive the signals (such as the packets of data). If the packets of data are addressed to the device, the device accepts and interprets the packets of data. As FIG. 1 shows, a computer 38, a printer 40, an audio system 42, a telephone 44, and other devices may receive both electrical power and packets of data via power line network 18. The power line network 18 may even include wireless portions and access points providing wireless communications with devices. Because the power line network 18 is known, this patent will not further describe the power line network 18.

Figure 2:
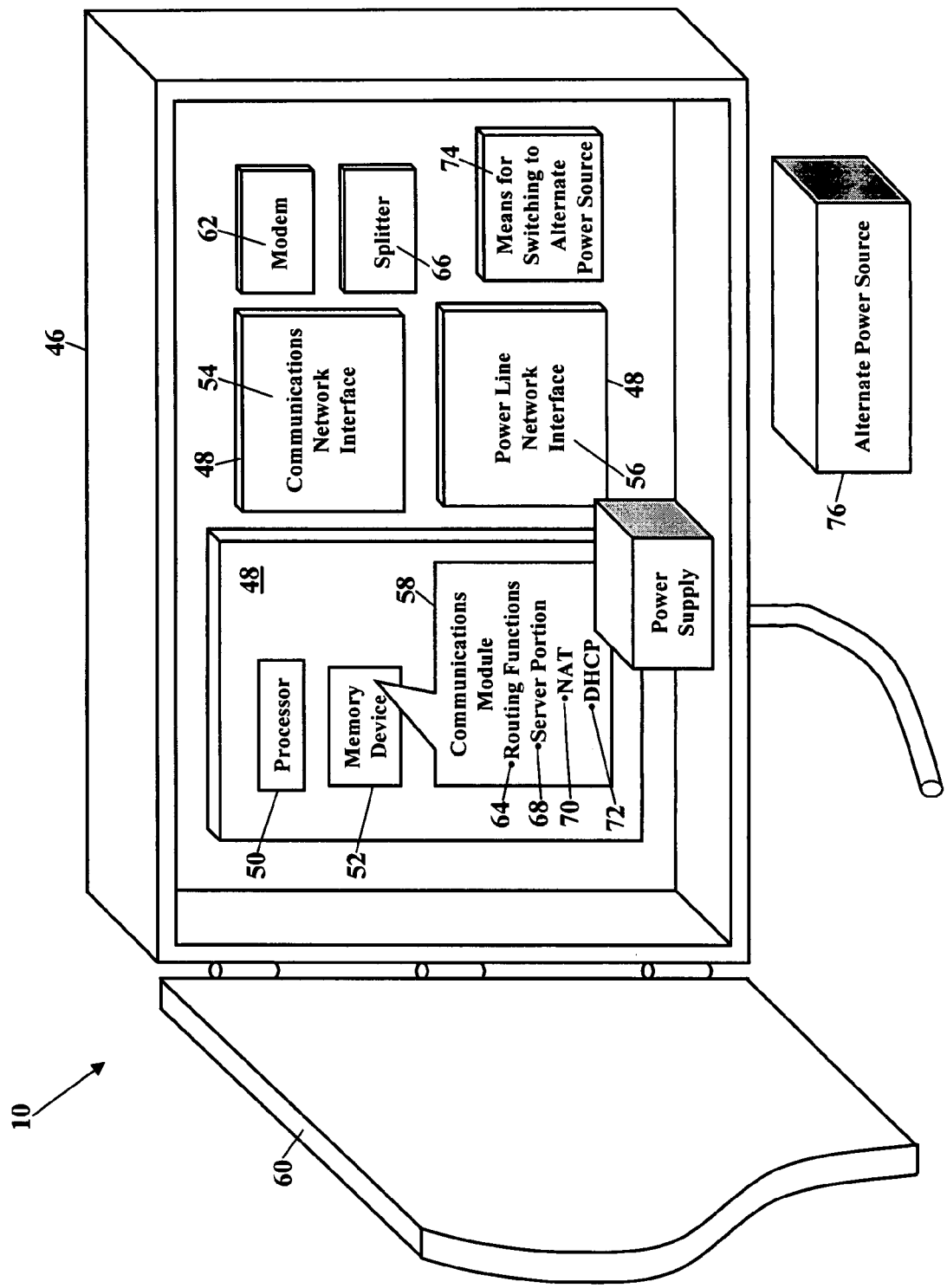
FIG. 2 is a detailed schematic of a network interface device shown in FIG. 1, according to the exemplary embodiments.

FIG. 2 is a more detailed schematic of the network interface device 10 shown in FIG. 1, according to the exemplary embodiments. The network interface device 10 has an all-weather enclosure 46 sheltering one or more circuit boards 48. The one or more circuit boards 46 comprise a processor 50 communicating with a memory device 52, a communications network interface 54 to the communications network (shown as reference numeral 16 in FIG. 1), a power line network interface 56 to the power line network (shown as reference numeral 18 in FIG. 1), and a communications module 58 stored in the memory device 52. The communications network interface 54 brokers transmissions of data to and from the communications network, while the power line network interface 56 brokers transmissions of data to and from the power line network. The communications module 58 is a computer program that provides gateway services for the communications network and for the power line network. An access door 60 provides access to the internal componentry of the network interface device 10.

FIG. 2 also shows additional components. The network interface device 10 may include a modem 62 modulating and demodulating signals sent and/or received via the communications network and/or the power line network (shown, respectively, as reference numerals 16 and 18 in FIG. 1). The communications module 58 may also perform routing functions 64 that forward data packets to a proper destination via the communications network and/or the power line network. The network interface device 10 may include a splitter 66 that divides low frequency signals and high frequency signals (such as when a digital subscriber line provides access to the communications network). The communications module 58 may also perform server functions 68 that provide data files to the communications network interface and/or the power line network interface. The communications module 58 may also provide network address translation (NAT) functions 70 and Dynamic Host Configuration Protocol (DHCP) functions 72. As those of ordinary skill in the art understand, Network Address Translation is software and/or hardware that converts the IP address from a private address to a public address real time. NAT is used in home networks and corporations to allow multiple PCs to access the internet via T-1, ADSL, SDSL or Cable Modem. As those of ordinary skill in the art also understand, Dynamic Host Configuration Protocol is a protocol that lets network administrators centrally manage and automate the assignment of IP Addresses in a network. DHCP lets a network administrator supervise and distribute IP addresses from a central point and automatically sends a new IP address when an addressable device is plugged into the power line network.

The network interface device 10 also includes the connection 24 to electrical power. Because the network interface device 10 would become inoperative during an electrical disruption, the network interface device 10 may include means 74 for switching to an alternate power source 76. The means 74 for switching to an alternate power source may include a transfer switch that automatically connects the alternate power source 76 to the network interface device 10. Should electrical power from the service provider be interrupted, the alternate power source 76 (such as a generator, solar cells, fuel cell, and/or battery) is selected to provide a source of alternate electricity. The means 74 for switching to the alternate power source, however, may include a manually-operated transfer switch that connects the alternate power source 76 to the network interface device 10. The communications module 58 may alternatively or additionally monitor the electric power (voltage and current) available from the electric service provider. When the electrical power is inadequate (such as during an interruption), the communications module 58 may include computer instructions that cause the alternate power source 76 to be automatically connected to the network interface device 10. The communications module 58 may alternatively or additionally monitor the frequency of the electrical power provided by the alternate power source 76 to separate high frequency data signals from low frequency power signals. The communications module 58 monitors the frequency of the electrical power provided by the alternate power source 76 to reduce back-feeding electrical power.

Figure 3:
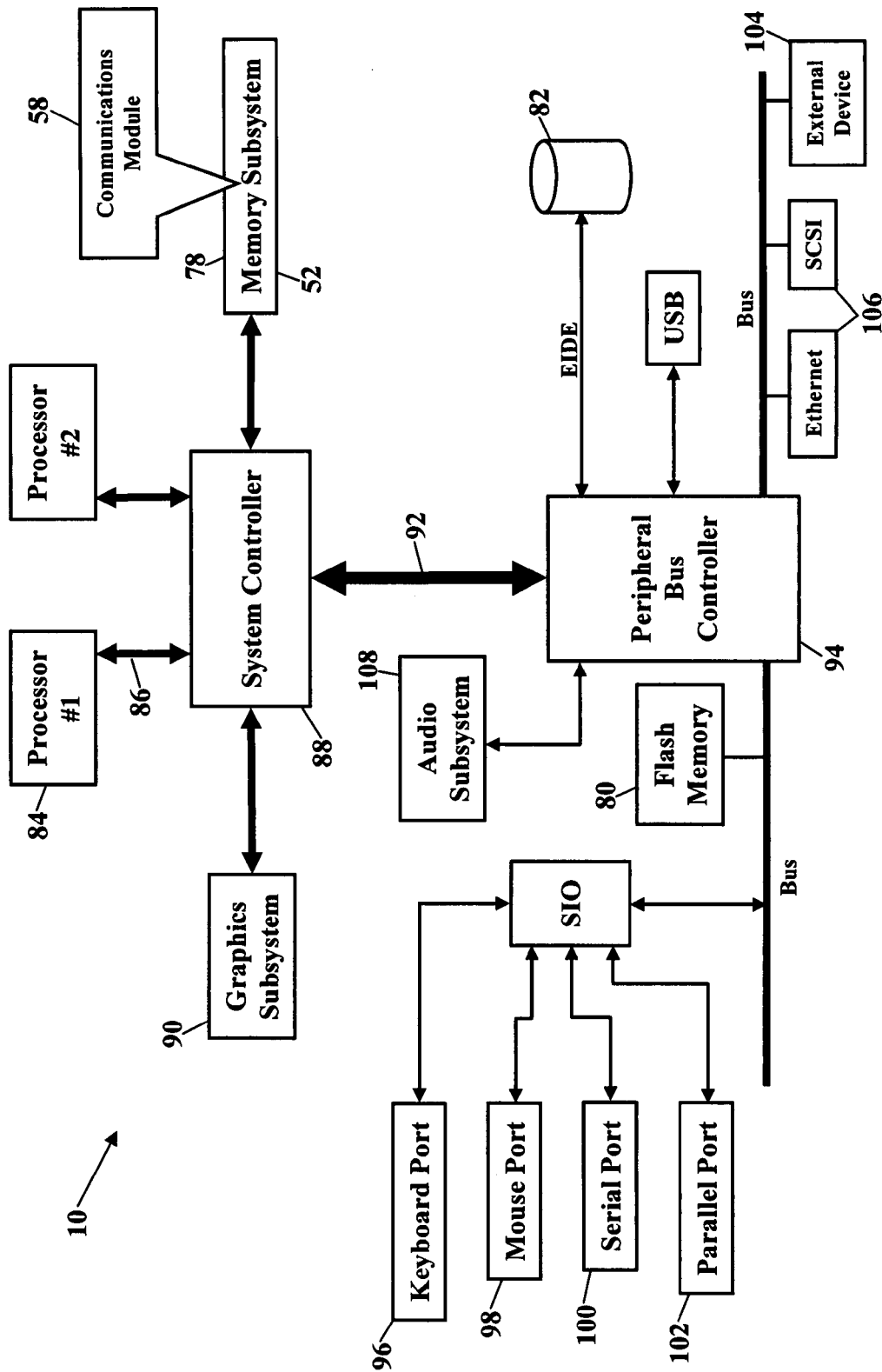
FIG. 3 is a block diagram of the network interface device shown in FIGS. 1 and 2, according to the exemplary embodiments.

FIG. 3 depicts another possible operating environment for the exemplary embodiments. FIG. 3 is a block diagram of the network interface device 10 shown in FIGS. 1 and 2. As FIG. 3 shows, the communications module 58 operates within the system memory device 52. The communications module 58 is shown residing in a memory subsystem 78, although the communications module 58 could also reside in flash memory 80, in a peripheral storage device 82, in firmware or hardware, and/or in any combination. The network interface device 10 also has one or more central processors 84 executing an operating system. The operating system, as is well known, has a set of instructions that control the internal functions of the network interface device 10. A system bus 86 communicates signals, such as data signals, control signals, and address signals, between the central processor 84 and a system controller 88 (typically called a "Northbridge"). The system controller 88 provides a bridging function between the one or more central processors 68, a graphics subsystem 90, the memory subsystem 78, and a PCI (Peripheral Controller Interface) bus 92. The PCI bus 92 is controlled by a Peripheral Bus Controller 94. The Peripheral Bus Controller 94 (typically called a "Southbridge") is an integrated circuit that serves as an input/output hub for various peripheral ports. These peripheral ports are shown including a keyboard port 96, a mouse port 98, a serial port 100 and/or a parallel port 102 for a video display unit, one or more external device ports 104, and networking ports 106 (such as SCSI or Ethernet). The Peripheral Bus Controller 94 may also include an audio subsystem 108. Those of ordinary skill in the art understand that the program, processes, methods, and systems described in this patent are not limited to any particular computer system or computer hardware.

The processors 84 may be implemented with a digital signal processor (DSP) and/or a microprocessor. Advanced Micro Devices, Inc., for example, manufactures a full line of microprocessors (Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Texas Instruments offers a wide variety of digital signal processors (Texas Instruments, Incorporated, P.O. Box 660199, Dallas, Tex. 75266-0199, Phone: 972-995-2011, www.ti.com) as well as Motorola (Motorola, Incorporated, 1303 E. Algonquin Road, Schaumburg, Ill. 60196, Phone 847-576-5000, www.motorola.com). There are, in fact, many manufacturers and designers of digital signal processors, microprocessors, controllers, and other componentry that are described in this patent. Those of ordinary skill in the art understand that this componentry may be implemented using any suitable design, architecture, and manufacture. Those of ordinary skill in the art, then understand that this invention is not limited to any particular manufacturer's component, nor architecture, nor manufacture.

A preferred operating system, according to an exemplary embodiment, is the UNIX® operating system (UNIX® is a registered trademark of the Open Source Group, www.opensource.org). Other UNIX-based operating systems, however, are also suitable, such as LINUX® or a RED HAT® LINUX-based system (LINUX® is a registered trademark of Linus Torvalds, and RED HAT® is a registered trademark of Red Hat, Inc., Research Triangle Park, N.C., 1-888-733-4281, www.redhat.com). Other operating systems, however, are also suitable. Such other operating systems would include a WINDOWS-based operating system (WINDOWS® is a registered trademark of Microsoft Corporation, One Microsoft Way, Redmond Wash. 98052-6399, 425.882.8080, www.Microsoft.com). and Mac® OS (Mac® is a registered trademark of Apple Computer, Inc., 1 Infinite Loop, Cupertino, Calif. 95014, 408.996.1010, www.apple.com). Example operating systems of IP network elements including IP routers/switches/hubs/gateways/proxies include Cisco IOS (Internet Operating System), Vxworks, various proprietary OS's, and variations of UNIX. Those of ordinary skill in the art again understand that the program, processes, methods, and systems described herein are not limited to any particular operating system.

The system memory device (shown as memory subsystem 78, flash memory 80, or peripheral storage device 82) may also contain an application program. The application program cooperates with the operating system and with a video display unit (via the serial port 100 and/or the parallel port 102) to provide a Graphical User Interface (GUI). The Graphical User Interface typically includes a combination of signals communicated along the keyboard port 96 and the mouse port 98. The Graphical User Interface provides a convenient visual and/or audible interface with a technician/user of the network interface device 10. The network interface device 10 may further include one or more encoders, one or more decoders, input/output control, logic, one or more receivers/transmitters/transceivers, one or more clock generators, one or more Ethernet/LAN interfaces, one or more analog-to-digital converters, one or more digital-to-analog converters, one or more "Firewire" interfaces, and/or one or more PCMCIA interfaces. Those of ordinary skill in the art understand that the program, processes, methods, and systems described herein are not limited to any particular architecture or hardware.

The exemplary embodiments may include a computer program product. The computer program product stores computer-readable instructions on a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the embodiments, allow easy dissemination of the exemplary embodiments. A computer program product providing gateway services includes computer-readable instructions stored on the computer-readable medium. The instructions interface with a communications network and with a power line network and provide gateway services to the communications network and to the power line network. The voltage available from an electrical power source is monitored and, when the electrical power source is inadequate, the instructions automatically connect an alternate power source. The frequency of the alternate power source is monitored, and high frequency data signals are separated from low frequency power signals.

While the exemplary embodiments have been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A method, comprising:
   interfacing with a power line network to broker the transmission of signals to and from the power line network;
   receiving electrical power from a source;
   monitoring a voltage of the electrical power received from the source;
   when the voltage is inadequate, then automatically connecting an alternate power source;
   monitoring a frequency of electrical power provided by the alternate power source; and
   separating high frequency data signals from low frequency power signals.

2. The method according to claim 1, further comprising interfacing with a communications network to broker the transmission of data to and from the communications network.

3. The method according to claim 1, wherein receiving the electrical power from the source comprises receiving the electrical power from an electrical distribution panel.

4. The method according to claim 1, wherein receiving the electrical power from the source comprises receiving the electrical power from an electrical power meter.

5. The method according to claim 1, wherein receiving the electrical power from the source comprises receiving the electrical power from an electrical outlet.

6. The method according to claim 1, further comprising remotely monitoring the voltage of the electrical power received from the source.

7. The method according to claim 1, further comprising remotely monitoring the frequency of the electrical power provided by the alternate power source.

8. The method according to claim 1, further comprising at least one of modulating and demodulating signals.

9. The method according to claim 1, further comprising forwarding data packets to a destination.

10. The method according to claim 1, further comprising dividing low frequency signals and high frequency signals.

11. The method according to claim 1, further comprising converting an IP address.

12. A system, comprising:
    means for interfacing with a power line network to broker the transmission of signals to and from the power line network;
    means for receiving electrical power from a source;
    means for monitoring a voltage of the electrical power received from the source;
    when the voltage is inadequate, then means for automatically connecting an alternate power source;
    means for monitoring a frequency of electrical power provided by the alternate power source; and
    means for separating high frequency data signals from low frequency power signals.

13. The system according to claim 12, further comprising means for interfacing with a communications network to broker the transmission of data to and from the communications network.

14. The system according to claim 12, further comprising means for receiving the electrical power from an electrical distribution panel.

15. The system according to claim 12, further comprising means for receiving the electrical power from an electrical power meter.

16. The system according to claim 12, further comprising means for receiving the electrical power from an electrical outlet.

17. The system according to claim 12, further comprising means for remotely monitoring the voltage of the electrical power received from the source.

18. The system according to claim 12, further comprising means for remotely monitoring the frequency of the electrical power provided by the alternate power source.

19. A computer program product comprising processor executable instructions for performing a method, the method comprising:

interfacing with a power line network to broker the transmission of signals to and from the power line network;

receiving electrical power from a source;

monitoring a voltage of the electrical power received from the source;

when the voltage is inadequate, then automatically connecting an alternate power source;

monitoring a frequency of electrical power provided by the alternate power source; and separating high frequency data signals from low frequency power signals.

20. The computer program product according to claim 19, further comprising:

remotely monitoring the voltage of the electrical power received from the source; and remotely monitoring the frequency of the electrical power provided by the alternate power source.

* * * * *